(No Model.) 2 Sheets—Sheet 1.
G. W. KIRKPATRICK.
GRAIN AND GRASS SEEDER.
No. 342,209. Patented May 18, 1886.
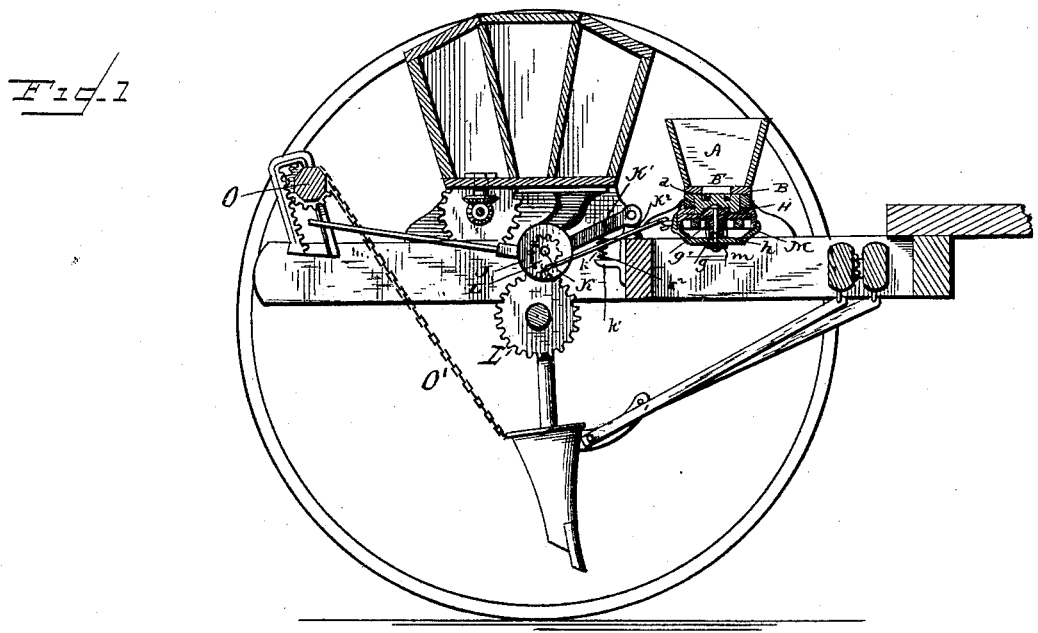
WITNESSES
INVENTOR
Geo. W. Kirkpatrick
by
Attorney (No Model.) 2 Sheets—Sheet 2.
G. W. KIRKPATRICK.
GRAIN AND GRASS SEEDER.
No. 342,209. Patented May 18, 1886.
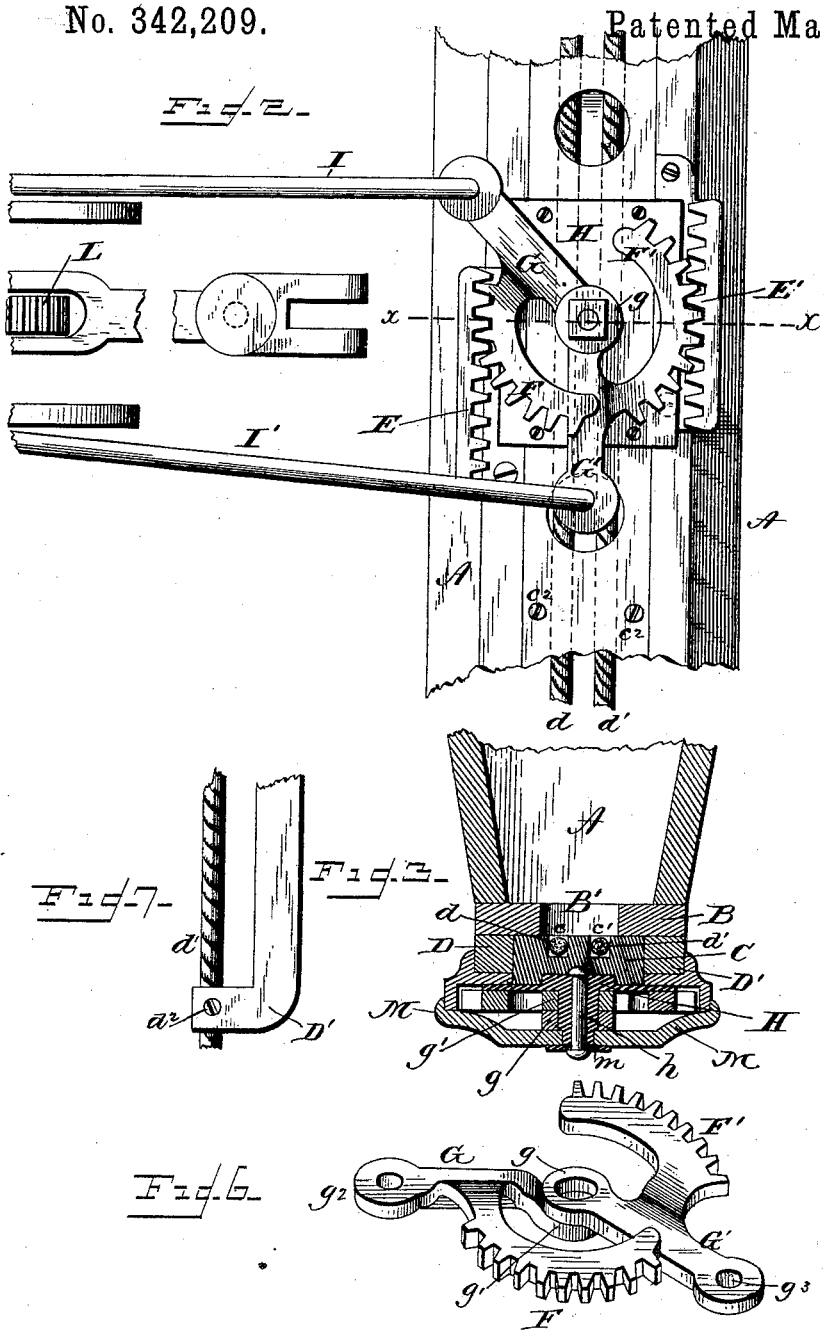
WITNESSES
INVENTOR
Geo. W. Kirkpatrick
by A. M. Smith
Attorney

UNITED STATES PATENT OFFICE.

GEORGE W. KIRKPATRICK, OF MACEDON, NEW YORK.

GRAIN AND GRASS SEEDER.

SPECIFICATION forming part of Letters Patent No. 342,209, dated May 18, 1886.

Application filed February 15, 1886. Serial No. 192,025. (No model.)

*To all whom it may concern:*

Be it known that I, GEORGE W. KIRKPATRICK, of Macedon, county of Wayne, and State of New York, have invented a new and useful Improvement in Grain and Grass Seeders, of which the following is a full, clear, and exact description, reference being had to the accompanying drawings, making part of this specification.

My invention relates to an improvement in seeding-machines, more particularly to that class known as "force-feed" seeders, in which the seed is forced in a continuous stream, or at regular intervals and in the desired quantities, from the hopper through openings in the bottom, and thence to the ground.

My invention consists in the combination, with a hopper of ordinary construction, of rods or cords adapted by suitable mechanism, to be moved lengthwise of the hopper through grooves, into which the seed falls from the hopper, through which it is conveyed by the cords, and from which it passes through suitable outlet-openings provided for that purpose.

My invention consists, also, in a novel arrangement of mechanism for actuating said rods or cords, and for regulating their throw, and thereby the feeding capacity of the seeder; also, in the means for throwing the driving mechanism into and out of action, and in certain details of construction and arrangement of parts, hereinafter fully set forth.

In the accompanying drawings, Figure 1 represents a longitudinal section through a seeding-machine with my improvements applied. Fig. 2 is a bottom view of the hopper broken away, showing the bows and their cords, their driving mechanism, and the outlet-passages for the escape of the material to be sown; Fig. 3, a vertical transverse section through the same on the line $x\,x$, Fig. 2, showing also the gear-covering plate or dust-cap in section. Fig. 4 is a plan view of the crank-disks for regulating the throw of the rods or bows and cords, and Fig. 5 a side elevation of the same, showing the means for throwing the crank-disks into and out of operation. Fig. 6 is a detached perspective view of the toothed segments, which gear with racks on the bows for driving them, and Fig. 7 is a detached view of one end of one of the rods or bows and cords.

A represents the hopper of the machine, in which the material to be sown is deposited. The hopper may be of any preferred form, the one shown being of a length corresponding to the width of the machine or seeder to which it is applied. The machine itself may also be of any usual or preferred construction. B represents the bottom of said hopper, which extends the entire length thereof, and is provided with perforations or receiving-orifices B' at suitable distances throughout its length, into and through which the seed falls, to be acted upon as hereinafter set forth. Beneath the bottom board, B, extending the entire length thereof, and secured thereto by screws $c^2\,c^2$, is another board or bottom piece, C, of slightly less width than the former, provided on its upper face and throughout its entire length with two parallel grooves, $c\,c'$, which underlie the receiving-orifices B', before referred to. Instead, however, of forming the two parts B and C separately, they may be constructed from one piece of wood or other suitable material. In this latter case the receiving-orifices B' are cut through simply as far as the grooves $c\,c'$, in order that the seed may fall therein.

The grooves $c$ and $c'$ may be round, half-round, or rectangular in form, as desired, and their distance apart or from each other is limited only to secure a proper dividing piece or wall, as shown in Fig. 3. $d\,d'$ represent cords or rods which lie and travel in said grooves $c\,c'$. They are stretched upon and carried by bows or frames D D', substantially the same in form as ordinary bows. (See Fig. 7.)

The bows D D' may be made from wood or any suitable material, and the cords $d\,d'$ may be of hemp or wire or other material, spirally-grooved wood or metallic rods, or iron or wire rods wrapped with wire, and are secured to the bows by set-screws $d^2$, as shown, or in other suitable manner.

Secured to the under faces of the bows D D', at or near midway of their length, are toothed racks E and E', the teeth of which, by preference, extend inward toward each other, and are engaged and driven by pivoted and vibrating or oscillating segments F F'. These vibrator-segments F F' are constructed substantially as shown in Figs. 2 and 6—that is, both are curved in an arc of a circle of which their common pivotal point is the center. They are each formed upon or cast in one piece with an arm or lever, G or G', and these arms or levers are provided with collars $g$ $g'$, as shown, which surround and turn upon a hub, $h$, formed upon a plate, H, secured to the bottom of the hopper. In this manner the vibrator-segments are adapted to be vibrated around the hub $h$ as a center, and when thus vibrated to engage and actuate the racks E E' for imparting motion to the cords $d$ $d'$. The outer vibrating ends of the arms G G' are also perforated, as shown at $g^2$ $g^3$, for the reception of the bent ends of links or rods I I', by means of which motion is imparted to the vibrator-segments. The rods or links I I' extend rearward from beneath the hopper to a point over the axle of the machine or other actuating-shaft, where they connect with and are actuated by crank-disks J and J', mounted on a short shaft, K, journaled in a pivoted frame, K'. The frame K' is pivoted at its forward end to a bracket or standard, K$^2$, secured to one of the cross-bars of the seeder-frame, and is upheld by a stout spiral spring, $k$, interposed between it and a lug or shelf, $k'$, on the standard K$^2$, referred to, said spring being held in place by a pin, $k^2$, on said lug or shelf, or in any other suitable manner.

Any form of spring may be employed in lieu of the one shown without departing from my invention.

At a point approximately over the axle of the machine, where the axle K passes through the frame K', the latter is slotted, as shown, and a spur-pinion, L, secured upon the shaft K within the said slot in such manner as to be engaged and driven by a gear-wheel, L'. Motion is thus imparted from the axle or other suitable shaft of the machine to the wheel L', thence to the pinion L, which, being mounted upon and keyed to the same shaft as the disks J and J', actuates said disks, which in turn operate the links or rods I and I'. The latter in their movements operate the vibrator-segments through their arms G and G', and thus motion is imparted through the racks E and E' to the bows D and D' and the cords $d$ $d'$.

The pivoted frame K' extends rearward and projects beneath the adjustable lifting-roller O, which is of the ordinary description of lifting-rollers for elevating the hoes or teeth of grain drills. This roller O when rocked rides up an inclined rack, as shown, whereby the lifting-chain O' is wound upon said roller and the hoes lifted. When the roller is rocked and rides up the inclined rack for lifting the hoes or teeth, as described, the projecting end of the frame K', relieved of the weight of said roller and hoes, is forced upward by the spring $k$, and the gear-wheels are thrown out of gear and the operation of the seeder suspended. By allowing the roller O to descend the frame K' is depressed, the gear-wheels mesh, and the seeding devices are again thrown into action.

The disks J and J', which turn with the shaft K and carry the ends of the rods or links I and I', are each provided with a series of perforations, $j$ $j$, arranged as shown, or radiating from the center of the disks to near the periphery thereof. The object of providing series of these perforations is to provide means whereby the throw of the vibrator-segments may be increased or diminished and regulated, thus the nearer the center of the disks the links or rods are connected the shorter will be the throw of the rods, and consequently the less the throw or movement of the cords within the grooves in the hopper-bottom, while the nearer to the periphery of the disks the links or rods are connected the greater will be the throw of the rods, and consequently the greater the movement of the cords within the bottom of the hopper.

The links or rods I and I' may be connected with the disks in any desired relation thereto, but I prefer to arrange them as shown in Figs. 1, 2, and 4—that is, with their ends one-quarter of a revolution apart on the disks J and J', so that while one of the feeder-cords $d$ is near the end of its throw the other, $d'$, will be moving at full speed, thus securing a very important result—viz., there will never be a common point of rest to both feeding-cords, but one or the other will always be moving at speed, and thus a continuous feed is secured.

The greater the throw of the reciprocating cords the larger will be the amount of seed discharged, for it will be apparent that the feeder-cords will necessarily have to move more rapidly in order to travel the distance required for the long throw in the same time that is allowed for a shorter throw.

The discharge-orifices have openings or perforations made in the hopper-bottom or part C, extending from the grooves $d$ $d'$ downward, and corresponding in dimensions with the receiving-orifices, but alternating therewith as to their location. The discharge-orifices, however, may be of any desired size, larger or smaller than the receiving-orifices, as found most convenient in practice. It is thought best to have the receiving and discharging orifices to alternate—that is, to locate each discharging-orifice midway between two of the receiving-orifices—but any preferred arrangement may be employed.

A covering-plate, M, for protecting the gearing from dust or injury, is secured beneath the same and the hopper upon the hub $h$, formed upon the plate H, where it is held in place by a nut or washer and rivet, $m$. The edges of the said plate M are extended upward and embrace the racks E and E', thereby helping to steady and guide them in their reciprocating movements.

Suitable openings are provided in the covering M for the passage and working of the rods or links I and I' and the ends of the arms G and G'. The bows D and D' are further steadied by the edges of the plate H, which extends beneath them, and also serves to uphold them in proper working position.

I do not wish to limit myself to the exact means for imparting the reciprocating movement to the feeder-cords, for any equivalent means may be substituted—such as providing the bows with pins on their under faces, and employing slotted levers, in lieu of the toothed segments, for operating the bows and cords.

Having now described my invention, I claim as new—

1. In a seeding-machine, the independently-actuated reciprocating cords or rods arranged to move in parallel lines, in combination with means for actuating said cords, substantially as described, whereby when one cord is at or near the end of its throw the other will be moving at speed, for the purpose and substantially as specified.

2. In a seeding-machine, the hopper-bottom provided with the parallel grooves and the traveling cords or rods moving therein, in combination with the vibrator-segments secured to and operating beneath the said hopper-bottom, substantially as described.

3. In a seeding-machine, the cords or rods traveling in the grooves in the hopper-bottom, the cord frames or bows, the toothed racks secured thereto, in combination with the vibrator-segments secured to the hopper-bottom and propelled by means substantially as described.

4. In a seeding-machine, the hopper-bottom provided with parallel grooves, the cords or rods traveling therein, the bows or frames carrying the said cords or rods, the toothed racks and the vibrator-segments, in combination with a gear-wheel on the main axle of the machine, and the pinion, disks, and connecting-rods interposed between the said vibrator-segments and gear-wheel on the main axle, substantially as described.

5. In a seeding-machine, the combination, with a gear-wheel mounted on the main axle, of a pinion gearing therewith, mounted in a pivoted frame, disks secured to the shaft of said pinion and adapted to rotate therewith, for imparting motion to the traveling cords or rods in the hopper-bottom, substantially in the manner described, and means for throwing said pinion into and out of gear with the gear-wheel on the axle, substantially as described.

6. In a seeding machine, the traveling cords or rods moving in parallel planes and carried by the bows or frames, as described, the toothed racks on the latter, and the vibrator-segments, all arranged and operating substantially as described, in combination with links or rods connecting said segments with and operating them from disks mounted on a shaft driven from the main axle of the machine, and means for regulating the throw of the links or rods and vibrator-segments, substantially as described.

7. In a seeding-machine, the traveling cords or rods moving in parallel lines, the frames or bows carrying said cords or rods, provided with the toothed racks, and the vibrator-segments engaging and operating said racks and cord-frames, in combination with links or rods connecting said segments with and operating them from disks mounted on a shaft driven from the main axle of the machine, and means for throwing said shaft into and out of driving connection with the main axle, all substantially as described.

In testimony whereof I have hereunto set my hand this 16th day of January, A. D. 1886.

GEORGE W. KIRKPATRICK.

Witnesses:
A. J. MARTIN,
W. L. ACKER.